United States Patent [19]
Reifenhauser

[11] 3,990,828
[45] Nov. 9, 1976

[54] APPARATUS FOR INTERNALLY CALIBRATING AN EXTRUDED SYNTHETIC-RESIN TUBE

[75] Inventor: Hans Reifenhäuser, Troisdorf, Germany

[73] Assignee: Reifenhäuser KG, Troisdorf, Germany

[22] Filed: Nov. 18, 1974

[21] Appl. No.: 524,890

[30] Foreign Application Priority Data
Nov. 21, 1973 Germany............................ 2357993

[52] U.S. Cl. ............................ 425/326 R; 425/72 R
[51] Int. Cl.² ........................................ B29F 3/08
[58] Field of Search.................. 425/72, 326 R, 377, 425/380

[56] References Cited
UNITED STATES PATENTS

| | | | |
|---|---|---|---|
| 2,987,765 | 6/1961 | Cichelli | 425/326 R X |
| 3,212,135 | 10/1965 | Branscum | 425/326 R |
| 3,307,219 | 3/1967 | Bigland | 425/72 X |
| 3,329,999 | 7/1967 | Cook | 425/72 |
| 3,445,891 | 5/1969 | Thordarson | 425/72 |
| 3,762,853 | 10/1973 | Upmeier | 425/326 R |
| 3,898,028 | 8/1975 | Upmeier | 425/326 R |

*Primary Examiner*—J. Howard Flint, Jr.
*Attorney, Agent, or Firm*—Karl F. Ross; Herbert Dubno

[57] ABSTRACT

A synthetic-resin tube as it emerges longitudinally from an extruder is passed over a two-part mandrel. A coolant such as water issuing from the upstream part of the mandrel passes axially downstream around the mandrel and is drawn into openings at the downstream part of the mandrel to draw the tube inwardly by suction toward the mandrel and impart to this tube the exact shape of the mandrel. Either or both of these parts may be formed as a longitudinal succession of transverse vanes having external peripheral shapes corresponding to the desired internal shape to be imparted to the tube. It is also possible to form either or both of the parts of the mandrel as a hollow cylindrical body formed with intake or output openings constituted as slits running either in the direction of travel or transverse thereto.

4 Claims, 4 Drawing Figures

U.S. Patent  Nov. 9, 1976  Sheet 1 of 2  3,990,828
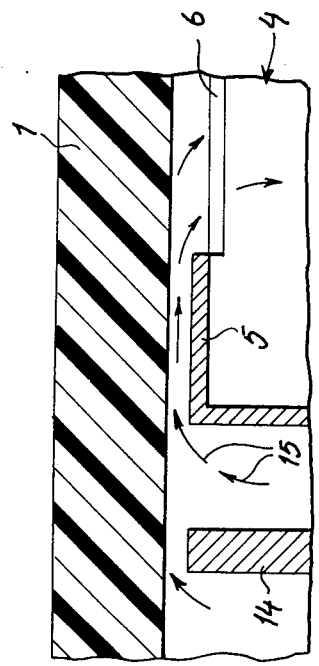
FIG. IA
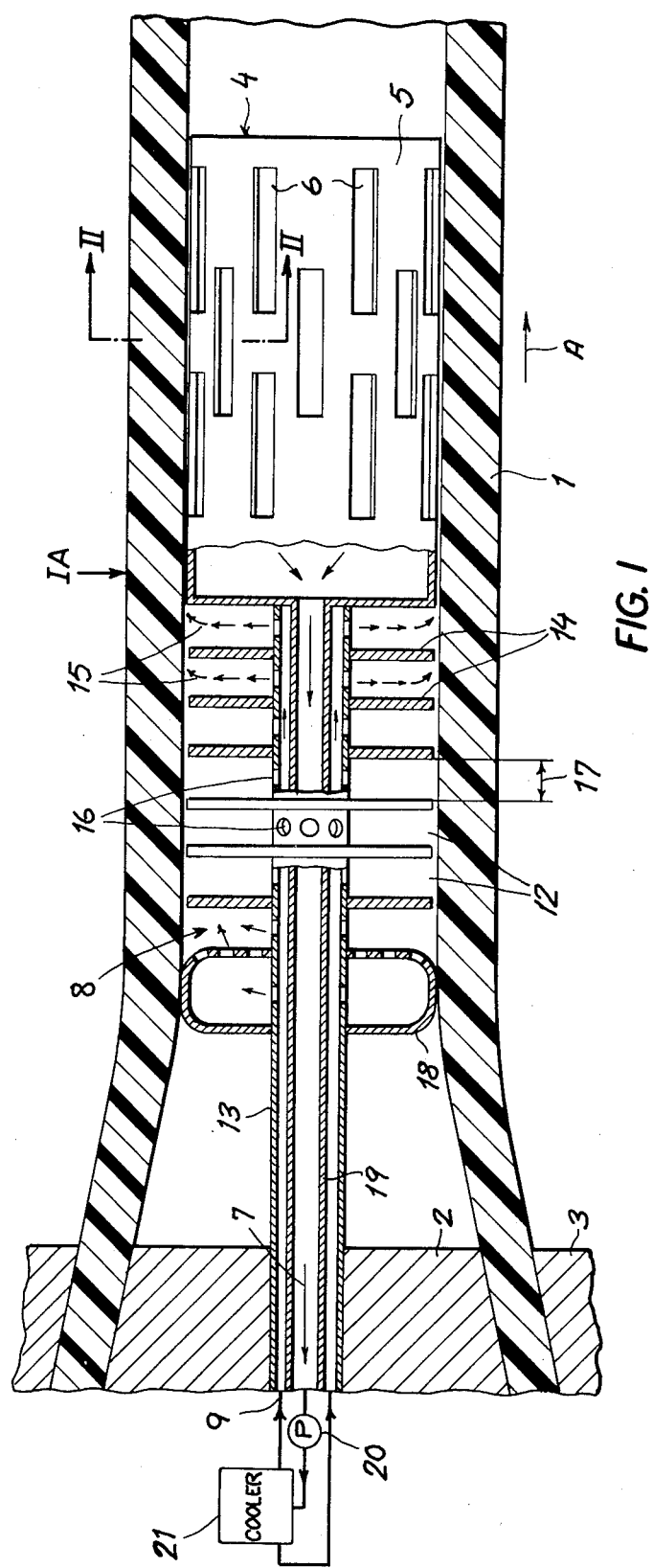
FIG. I

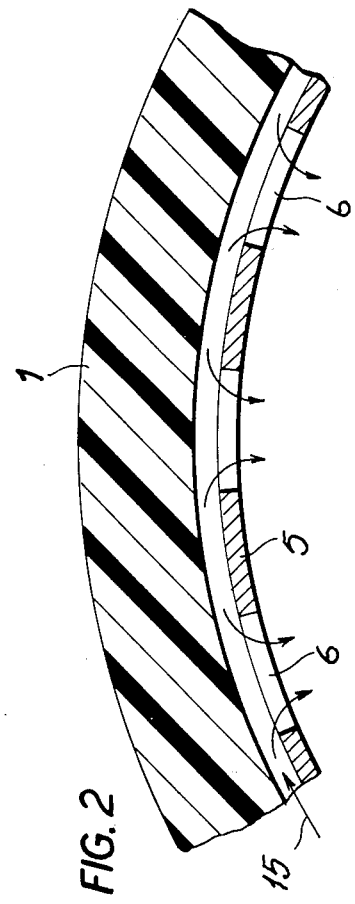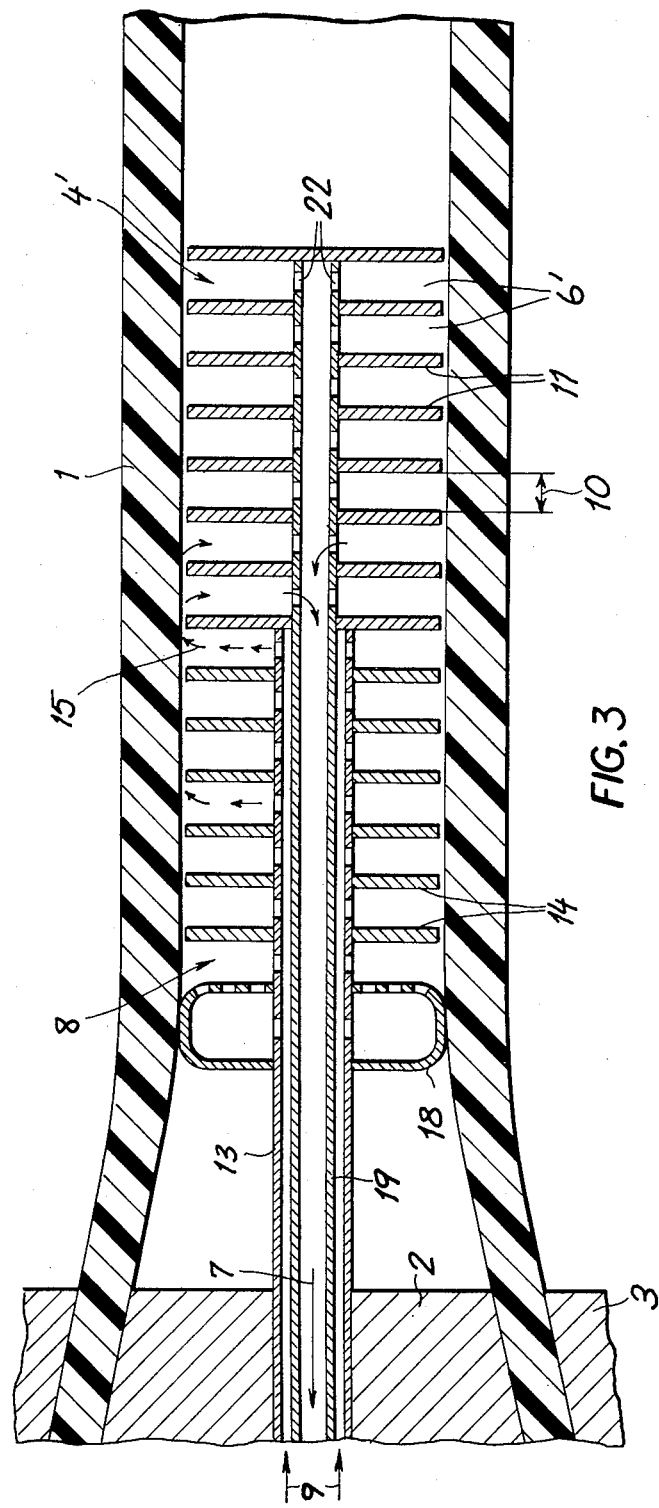
FIG. 2
FIG. 3

3,990,828

APPARATUS FOR INTERNALLY CALIBRATING AN EXTRUDED SYNTHETIC-RESIN TUBE

FIELD OF THE INVENTION

The present invention relates to an apparatus for shaping an elongated synthetic-resin workpiece. More particularly this invention concerns a system for calibrating a synthetic-resin tube as it emerges from an extruder while still in plastic condition.

BACKGROUND OF THE INVENTION

As a synthetic-resin tube issues from an extruder it is frequently passed over a shaping mandrel having an external shape corresponding to the internal shape to be imparted to the workpiece. Such an arrangement is also used with U-shaped, T-shaped, and flanged synthetic-resin workpieces. The mandrel is secured to the extruder so that it is fixed while the synthetic-resin workpiece passes over it longitudinally.

This calibrating mandrel is usually hollow so that water or the like flow through it to cool it and aid in the hardening of the workpiece. Since the workpiece shrinks as it cools and hardens it is frequently considered unnecessary to press it against the outside of the calibrating mandrel. Such an arrangement gives unfortunately inadequate results, however, especially when working with large-diameter tubing.

It is also known to calibrate the outside of a hollow workpiece by means of a so called vacuum-sizing method. In this system the workpiece is drawn outwardly against a die by means of a pressure differential created between the inside and the outside of the tube. Thus the face of the die turned toward the workpiece is provided with a plurality of suction openings through which air or other fluid is drawn so as to pull the workpiece wall outwardly snugly against the die. This arrangement produces a relatively accurate shape on the outside of the tubing.

In none of the known methods is it possible to produce a tube whose internal shape is accurately calibrated. More particularly it is found to be almost impossible to produce a tube having an internal shape which is irregularly polygonal or similarly noncircular.

OBJECTS OF THE INVENTION

It is therefore an object of the present invention to provide an improved apparatus for shaping a plastic workpiece.

Another object of this invention is to provide a system for internally calibrating a synthetic-resin tube as it emerges continuously from an extruder in plastic condition.

Yet another object is to provide apparatus which accurately produces an internal shape in such an extruded workpiece.

SUMMARY OF THE INVENTION

These objects are attained according to the present invention in an arrangement wherein the tube is passed over a mandrel having an external shape corresponding to the desired internal shape to be imparted to the tube and a fluid is aspirated inwardly through this mandrel to draw the tube inwardly toward the mandrel and impart thereto that desired shape. In this manner it is possible accurately to reproduce virtually any shape inside a tube. This has been found to be extremely effective in producing very accurately virtually any shape in the inside of a synthetic-resin as it emerges from an extruder.

In accordance with another feature of this invention the calibrating mandrel is also used to cool the workpiece. This is effected by providing on the calibrating mandrel a plurality of openings connected to a pump and a cooler so that a fluid may be forced out of some of the openings and aspirated into the other opening. Thus this fluid acts both as a coolant and as the aspirating agent that draws the workpiece snugly against the mandrel.

According to yet another feature of the present invention a mandrel is formed at least partially or even wholly as a hollow tube or at least partially of a plurality of parallel discs spaced apart in the displacement direction of the tube. In the case of the hollow tube the fluid input and output holes may be formed as angularly and longitudinally equispaced slits either extending parallel to or transverse to the displacement direction of the tube. When a succession of longitudinally spaced discs are used the spaces between some of the discs constitute the output openings from which the coolant is expelled and others of the spaces between the discs constitute the input openings into which the coolant is drawn. In both cases it is preferable to expel the coolant at the upstream end and aspirate it at the downstream end of the mandrel.

The mandrel according to this invention is secured to the extruder by a pair of concentric tubes. The coolant is pumped into the mandrel between the outer tube and the inner tube and is withdrawn from the mandrel through the inner tube, or vice versa. Thus in accordance with the present invention the shaping does not actually take place directly against the calibrating mandrel but is effected by a very thin layer of fluid flowing along this calibrating mandrel and drawing the workpiece tight against it by the Bernoulli effect. In accordance with the present invention water is used as the shaping fluid and coolant, although it lies within the scope of the invention to use air or another gas.

The present invention allows tubing of relatively large diameter to be produced with an exact inside diameter. Moreover it is possible according to the present invention to extrude a round-section tube and to form it thereafter into a tube of polygonal-section with an exact inner calibration. It is also possible to combine the internal-calibration apparatus of the present invention with an external-calibration device, also of the vacuum-sizing type. In this arrangement it is advisable to use a foaming agent in the synthetic resin so that a predetermined volume of expansion will be produced between the inside calibrator and the outside calibrator. It is possible with this arrangement to produce a tubing having a predetermined shape on its inside wall and another shape on its outside wall.

BRIEF DESCRIPTION OF THE DRAWING

The above and other objects, features, and advantages of the invention will become more readily apparent from the following description, reference being made to the accompanying drawing in which:

FIG. 1 is an axial section through an apparatus according to the present invention;

FIG. 1A is a large-scale view of the detail of FIG. 1 indicated by arrow IA;

FIG. 2 is a section taken along line II—II of FIG. 1, in enlarged scale; and

FIG. 3 is a section similar to FIG. 1 illustrating another arrangement in accordance with the present invention.

SPECIFIC DESCRIPTION

The apparatus according to the present invention operates on a tube 1 of synthetic-resin pressed from an extruder 3 around a shaping mandrel 2 thereof. A hollow calibrating mandrel 4 is secured downstream of the extruder 3 in the direction of extrusion indicated by the arrow A. The outer surface 5 of this mandrel 4 is formed with a plurality of throughgoing holes 6 opening into the interior of the hollow mandrel 4 and formed as angularly equispaced but longitudinally extending slits. A fluid is drawn in through these holes 6, as indicated by arrow 7, by a pump 20 that forces it through a cooler 21 and than back as illustrated by arrow 9 to a cooler 8 upstream of this calibrating mandrel 4.

The cooling device 8 comprises a succession of discs 14 longitudinally spaced apart by equidistant gaps 17 and secured to an outer tube 13 fixed in the extruder 3. The cooled coolant is fed to the interior of this tube 13 and escapes from the outlets 16 in the gaps 17 between the plates 14 toward the interior of the tube 1 as shown by arrows 15 and pass therealong in the radial gap 12. FIG. 1A indicates how this coolant then flows forwardly in the gap 12, that is in the direction of A, and into the holes 6 where it is drawn back through a tube 19 that leads to the pump 20. The tubes 13 and 19 are coaxial and concentric. At the extreme upstream end of the cooler 8 there is provided a plug 18 which is of slightly larger diameter than the discs 14 and serves to prevent the coolant from moving back upstream in the tube 1 past this plug 18. The plug 18 is perforated on its downstream side and is connected through the tube 13 to the interior thereof so that coolant also flows out of the downstream face of this plug 18.

FIG. 3 shows how the cylindrical hollow mandrel 4 can be replaced by a mandrel structure 4' comprised of a row of circular plates 11 separated by gaps 10 defining intake openings 6' that communicate through holes 22 with the interior of the central tube 19 and thence back to the pump 20 as described above.

I claim:
1. An apparatus for producing an internally calibrated hollow profile, comprising:
    an extruder having an extrusion die for extruding a thick-wall thermoplastic synthetic resin continuous hollow profile;
    a hollow calibrating mandrel disposed downstream of said die within said hollow profile and internally calibrating same, said mandrel being formed along its periphery with suction openings for drawing a fluid into said mandrel and the inner wall of said hollow profile theretoward by suction;
    a cooling device between said mandrel and said die disposed in said hollow profile and including a plurality of axially spaced disks extending transversely to said hollow profile, and coolant-distribution means opening between said disks to permit a coolant to pass outwardly between said disks into contact with said wall of said hollow profile to cool the same partially before it reaches said mandrel, said coolant thereafter passing as said fluid into said openings of said mandrel; and
    suction means for evacuating said mandrel and means for supplying said coolant to said distribution means.

2. The apparatus defined in claim 1 wherein said cooling device further comprises a coolant chamber disposed ahead of said disks and provided with orifices opening in the direction thereof and discharging said coolant.

3. The apparatus defined in claim 1 wherein said suction means is a pump recirculating the fluid drawn from said mandrel to said distribution means.

4. The apparatus defined in claim 3 wherein said pump is connected in series with an external cooler for cooling said fluid to form said coolant.

* * * * *